United States Patent
Arnone et al.

(10) Patent No.: US 8,520,341 B2
(45) Date of Patent: Aug. 27, 2013

(54) REDUCING GRAM LOAD CHANGE IN ACTUATOR ARM IN A HARD DISK DRIVE

(75) Inventors: Gregory Joseph Arnone, San Jose, CA (US); Zhong-Qing Gong, Fremont, CA (US); David John Loader, San Jose, CA (US); Yanchu Xu, San Jose, CA (US); Yiduo Zhang, Cupertino, CA (US)

(73) Assignee: HGST Netherlands B.V., Amsterdam (NL)

( * ) Notice: Subject to any disclaimer, the term of this patent is extended or adjusted under 35 U.S.C. 154(b) by 295 days.

(21) Appl. No.: 12/629,802

(22) Filed: Dec. 2, 2009

(65) Prior Publication Data
US 2011/0128653 A1    Jun. 2, 2011

(51) Int. Cl.
G11B 5/48  (2006.01)
G11B 21/16 (2006.01)
G11B 5/55  (2006.01)
G11B 21/08 (2006.01)

(52) U.S. Cl.
USPC ...................................... 360/244.6; 360/266.1

(58) Field of Classification Search
USPC .......... 360/244.2, 244.5–244.7, 265.7, 265.9, 360/266.1
See application file for complete search history.

(56) References Cited

U.S. PATENT DOCUMENTS

| | | | | |
|---|---|---|---|---|
| 4,875,117 A * | 10/1989 | Slezak et al. | ................ | 360/98.01 |
| 5,187,626 A * | 2/1993 | Hopkins et al. | ............ | 360/265.9 |
| 5,870,254 A | 2/1999 | Baserman et al. | | |
| 6,046,885 A | 4/2000 | Aimonetti et al. | | |
| 6,061,206 A * | 5/2000 | Foisy et al. | ................ | 360/265.7 |
| 6,160,684 A | 12/2000 | Heist et al. | | |
| 6,183,841 B1 | 2/2001 | Hanrahan et al. | | |
| 6,198,602 B1 * | 3/2001 | Vera et al. | .................. | 360/244.5 |
| 6,229,677 B1 | 5/2001 | Hudson et al. | | |
| 6,368,685 B1 | 4/2002 | Schmidt et al. | | |
| 7,024,754 B1 | 4/2006 | Crowder et al. | | |
| 7,165,314 B2 | 1/2007 | Wang et al. | | |
| 7,190,555 B2 | 3/2007 | Hanrahan et al. | | |
| 2002/0051318 A1* | 5/2002 | Kant et al. | ................. | 360/244.6 |
| 2002/0181161 A1* | 12/2002 | Buske et al. | ............... | 360/266.3 |
| 2005/0078407 A1* | 4/2005 | Diewanit et al. | ........... | 360/97.01 |
| 2006/0044693 A1* | 3/2006 | Shimozato | ................. | 360/244.6 |
| 2007/0139821 A1* | 6/2007 | White et al. | ............... | 360/244.5 |
| 2007/0146934 A1* | 6/2007 | Boljanovic et al. | ........ | 360/244.6 |

OTHER PUBLICATIONS

Kamnerdtong, et al., "The Improvement of Deformations and Characteristics of HGA During Clamping Using Finite Element Analysis", *Proceedings of the 2008 Winter Simulation Conference*, (2008),1335-1343.

* cited by examiner

*Primary Examiner* — Wayne Young
*Assistant Examiner* — Adam B Dravininkas

(57) ABSTRACT

Swaging a suspension base plate to an actuator arm for a hard disk drive. A portion of material adjacent to a hole in the actuator arm is removed to create an opening to receive material. A flange of the suspension base plate is inserted into the hole in the actuator arm. The suspension base plate is swaged to the actuator arm, wherein the swaging causes material from the suspension base plate to flow into the opening.

8 Claims, 5 Drawing Sheets

500

```
┌─────────────────────────────────────────────────────────────────────────────┐
│ A portion of material adjacent to a hole in the actuator arm is removed to  │
│ create an opening to receive material.                                      │
│                                    502                                      │
└─────────────────────────────────────────────────────────────────────────────┘
                                      │
                                      ▼
┌─────────────────────────────────────────────────────────────────────────────┐
│ A flange of the suspension base plate is inserted into the hole in the      │
│ actuator arm.                                                               │
│                                    504                                      │
└─────────────────────────────────────────────────────────────────────────────┘
                                      │
                                      ▼
┌─────────────────────────────────────────────────────────────────────────────┐
│ The suspension base plate is swaged to the actuator arm, wherein the swaging│
│ causes material from the suspension base plate to flow into the opening.    │
│                                    506                                      │
└─────────────────────────────────────────────────────────────────────────────┘
                    │                                     │
                    ▼                                     ▼
┌──────────────────────────────────┐   ┌──────────────────────────────────────┐
│ A gram load of the actuator arm  │   │ A torque retention of the swaging    │
│ is measured after the swaging.   │   │ the suspension base plate to the     │
│              508                 │   │ actuator arm is measured.            │
│                                  │   │              512                     │
└──────────────────────────────────┘   └──────────────────────────────────────┘
                    │
                    ▼
┌─────────────────────────────────────────────────────────────────────────────┐
│ A z-height variation of the actuator arm is measured after the swaging.     │
│                                    510                                      │
└─────────────────────────────────────────────────────────────────────────────┘
```

FIG. 5

REDUCING GRAM LOAD CHANGE IN ACTUATOR ARM IN A HARD DISK DRIVE

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The HDD typically includes at least one actuator arm. The actuator arm extends over a spinning magnetic disk and is used to control the position of a read/write head relative to the spinning magnetic disk. An actuator arm may be coupled with a suspension base plate or head suspension. Techniques used to couple a suspension base plate with an actuator arm may result in a portion of the suspension base plate and/or a portion of the actuator arm being deformed. Such a deformation can cause changes in the desired position orientation of the suspension known as z-height variations. The deformation can also result in changes to the spring characteristics of the suspension known as gram load changes. The deformations can occur on one or more actuator arm in the HDD and the deformations cause different results in different actuator arms in the HDD. For example, an inner actuator arm may have a greater increase in gram load than an outer actuator arm. These results cause undesirable performance in the HDD.

BRIEF DESCRIPTION OF THE DRAWINGS

FIG. 5 is a flowchart of a method for swaging a suspension base plate to an actuator arm for a hard disk drive in accordance with embodiments of the present invention.

DESCRIPTION OF EMBODIMENTS

Figure 1:
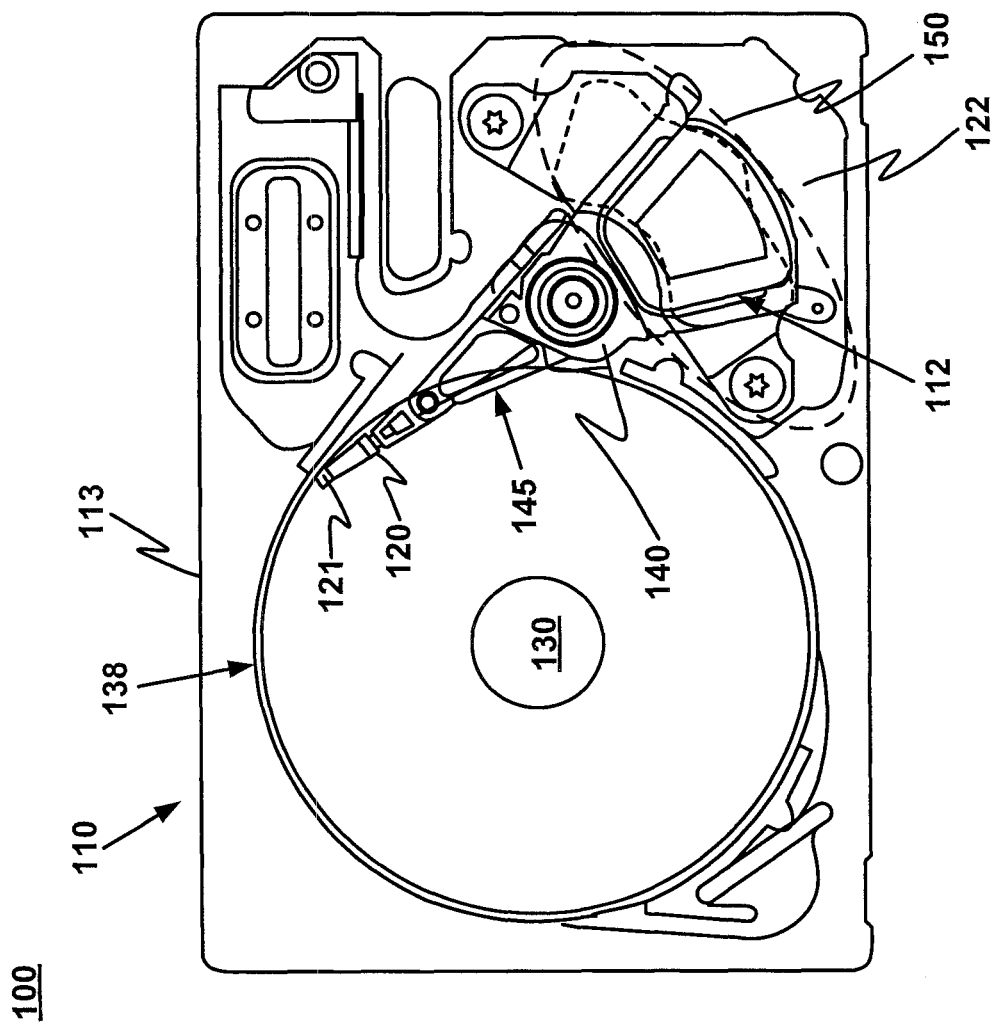
FIG. 1 is a block diagram of an HDD in accordance with embodiments of the present invention.

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

Overview of Discussion

The discussion will begin with a brief overview of the present invention. The discussion will then focus on a HDD and components connected therewith. The discussion will then focus on embodiments for reducing gram load change in actuator arm in a hard disk drive by swaging a suspension base plate to an actuator arm.

Techniques used to couple a suspension base plate with an actuator arm may result in a portion of the suspension base plate and/or a portion of the actuator arm being deformed. Such a deformation can cause changes in the desired position orientation of the suspension known as z-height variations. The deformation can also result in changes to the spring characteristics of the suspension known as gram load changes. Other possible deformations may occur to the twist and pitch of the suspension. The deformations can occur on one or more actuator arm in the HDD and the deformations cause different results in different actuator arms in the HDD. Therefore, it is desirable to construct an actuator arm with features to reduce the gram load changes.

Swaging is a technique used to couple a suspension base plate with an actuator arm. The process of swaging involves inserting a suspension base plate with a flange that has a hollow opening or hole with an inner diameter and an outer diameter. The outer diameter of the flange is designed to fit within a hole in the actuator arm. The suspension base plate is then swaged to expand the outer diameter to securely fasten the suspension base plate to the actuator arm. This swaging technique may cause the flange of the suspension base plate and/or the actuator arm to deform as described and cause changes to the gram load.

Embodiments of the present technology reduce the gram load changes due to swaging. In one embodiment, a portion of material of the actuator arm is removed adjacent to the hole in the actuator arm prior to the swaging process. As the flange of the suspension base plate is swaged to expand the outer diameter, the material of the flange flows into the removed portion of material in the actuator arm. Embodiments of the present technology result in reduced deformations of the suspension base plate and/or the actuator arm. Reduced deformations also result in reduced changes to the gram load and reduced z-height variations. Another feature of the present technology is increased measure of torque retention meaning that the suspension base plate is more securely fastened to the actuator arm.

Operation

The basic HDD model includes a magnetic storage disk or hard disk that spins at a designed rotational speed. An actuator arm with a suspended slider is utilized to reach out over the disk. The slider may comprise one or more magnetic read and write transducers or heads for reading and writing information to or from a location on the disk. The slider may also comprise a heater coil designed to change shape when heat is transferred to the heater coil by means of electric current. The slider is mounted on a suspension which connects to the actuator arm. In the case of multiple platter drives, there can be multiple suspensions attaching to multiple actuator arms as components of a head stack assembly. The head stack assembly also includes a voice coil which is part of a motor used for moving the arms to a desired location on the disk(s).

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, embodiments of the present technology are independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. An actuator arm controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read and write head is called the head stack assembly.

The ILS 120 has a spring-like quality, which biases or presses the air-bearing surface of slider 121 against disk 138 to cause slider 121 to fly at a precise distance from disk 138. Slider 121 may have a pole tip which protrudes at various lengths from slider 121. Slider 121 may also contain a read head, a write head and a heater coil. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138. Memory device 122 is capable of storing electronic data that can be used in the operation of HDD 110. Actuator at n controller 150, and other components of HDD 110, has the ability to access memory device 122 to receive information, data, instruction or commands related to its operation.

Figure 2:
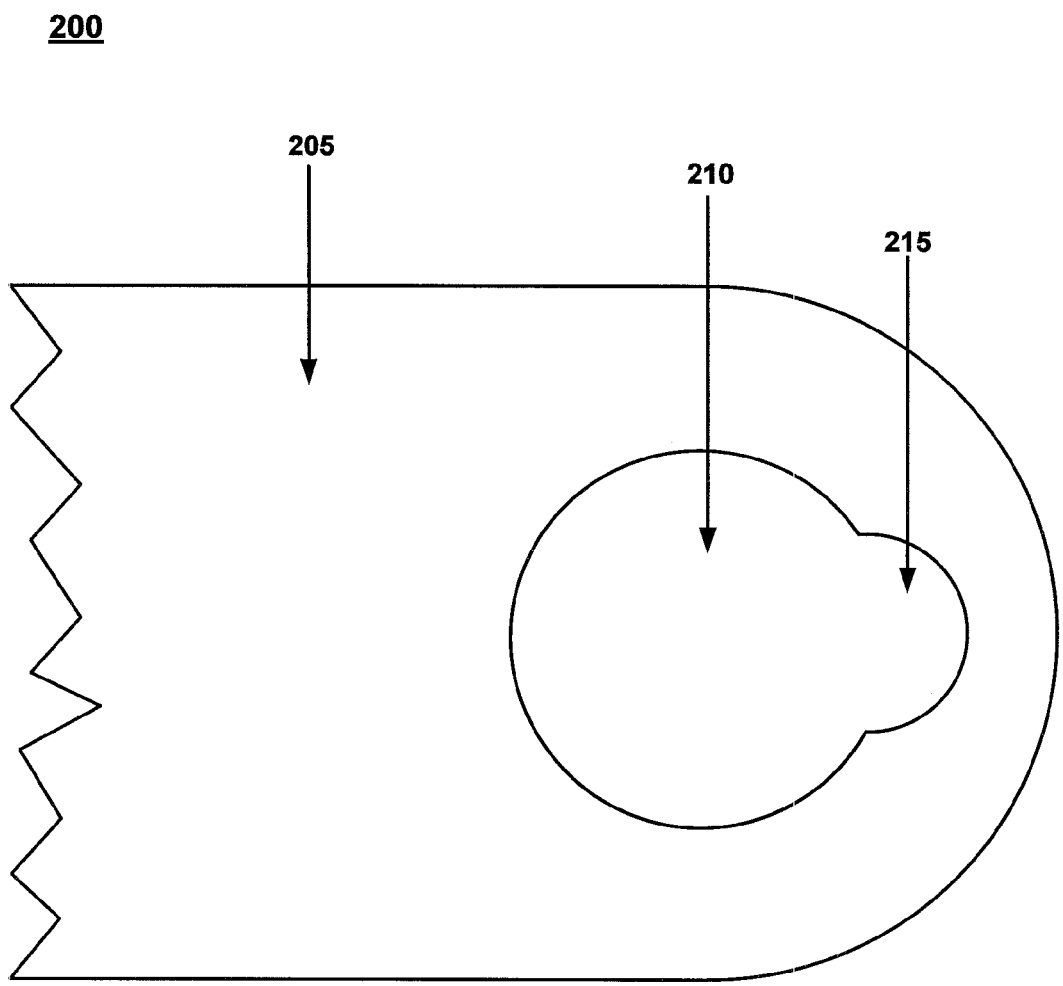
FIG. 2 is a block diagram of an actuator arm in accordance with embodiments of the present invention.

Reference will now be made to FIG. 2, a top view of a block diagram of an actuator arm to be used in an actuator arm assembly in a hard disk drive. FIG. 2 represents components of a HDD that may comprise some or all of the features of the components of FIG. 1. FIG. 2 depicts, actuator arm 205, hole 210, and removed portion 215. FIG. 2 comprises components and portions of the present technology that may or may not be used with different embodiments of the present technology and should not be construed to limit the present technology.

In one embodiment, actuator arm 205 is the same actuator arm as actuator arm 145 of FIG. 1. In one embodiment, actuator arm 205 is an outer actuator arm. In one embodiment, actuator arm 205 is an inner actuator arm. An inner actuator arm is defined to be an actuator arm in a HDD that is located or situated between two or more actuator arms. An outer actuator arm is defined to be an actuator arm in a HDD that is located or situated such that it is adjacent to only one other actuator arm.

In one embodiment, hole 210 is formed in actuator arm 205 to receive a flange or boss tower of a suspension base plate. FIG. 2 depicts an embodiment of the present technology in which the length of removed portion 215 is parallel to the length of hole 210 but is perpendicular to the length of actuator arm 205. Remove portion 215 creates an opening adjacent to hole 210 in actuator arm 205. In one embodiment, removed portion 215 is symmetrical along an axis that runs the length of actuator arm 205. In one embodiment, removed portion 215 is formed by stamping actuator arm 205. It should be appreciated that any number of techniques may be used to form removed portion 215.

In one embodiment, a plurality of actuator arms may be machine stamped in one step to form removed portion 215. For example, during the manufacturing process, both the inner an outer actuator arms of a HDD may stacked on top of each other and a machine may die cut all the actuator arms in the stack of actuator arms in one motion.

Actuator arm 205 is an example of an actuator arm that can be fastened to a suspension base plate using a swaging process or technique. In one embodiment, the flange of a suspension base plate is inserted into hole 210, the outer diameter of the flange is then expanded by a swaging process. During the swaging process, a portion of material from the flange of the suspension base plate flows into removed portion 215 of actuator arm 205. Thus, the shape of the suspension base plate changes in a controlled manner and reduces the deformations to both actuator arm 205 and the suspension base plate. Additionally, the portion of material from the flange that flows into removed portion 215 acts to securely fasten the suspension base plate to actuator arm 215 and therefore increase the torque retention of the fastening. The reduced deformations also results in reduced changes in gram loading and reduced z-height variations.

In one embodiment, actuator arm 205 is secured to a suspension base plate using ball swaging. Ball swaging is defined to be a swaging technique in which a ball is passed through an opening or hole that has a diameter that is smaller than the diameter of the ball. Thus ball swaging operates to increase the diameter of the object through which the ball is passed. In one embodiment, a pin is used to push a ball through an opening in a suspension base plate resulting in the outer diameter of the suspension base plate enlarging and a portion of material of the suspension base plate flowing into removed portion 215. In one embodiment, during the manufacturing process, a corresponding suspension base plate may be swaged to each of the inner and outer actuator arms in one step. In such an embodiment, the inner and outer actuator arms would be situated such that the holes in the actuator arms and the corresponding suspension base plates were all aligned with each other.

Figure 3:
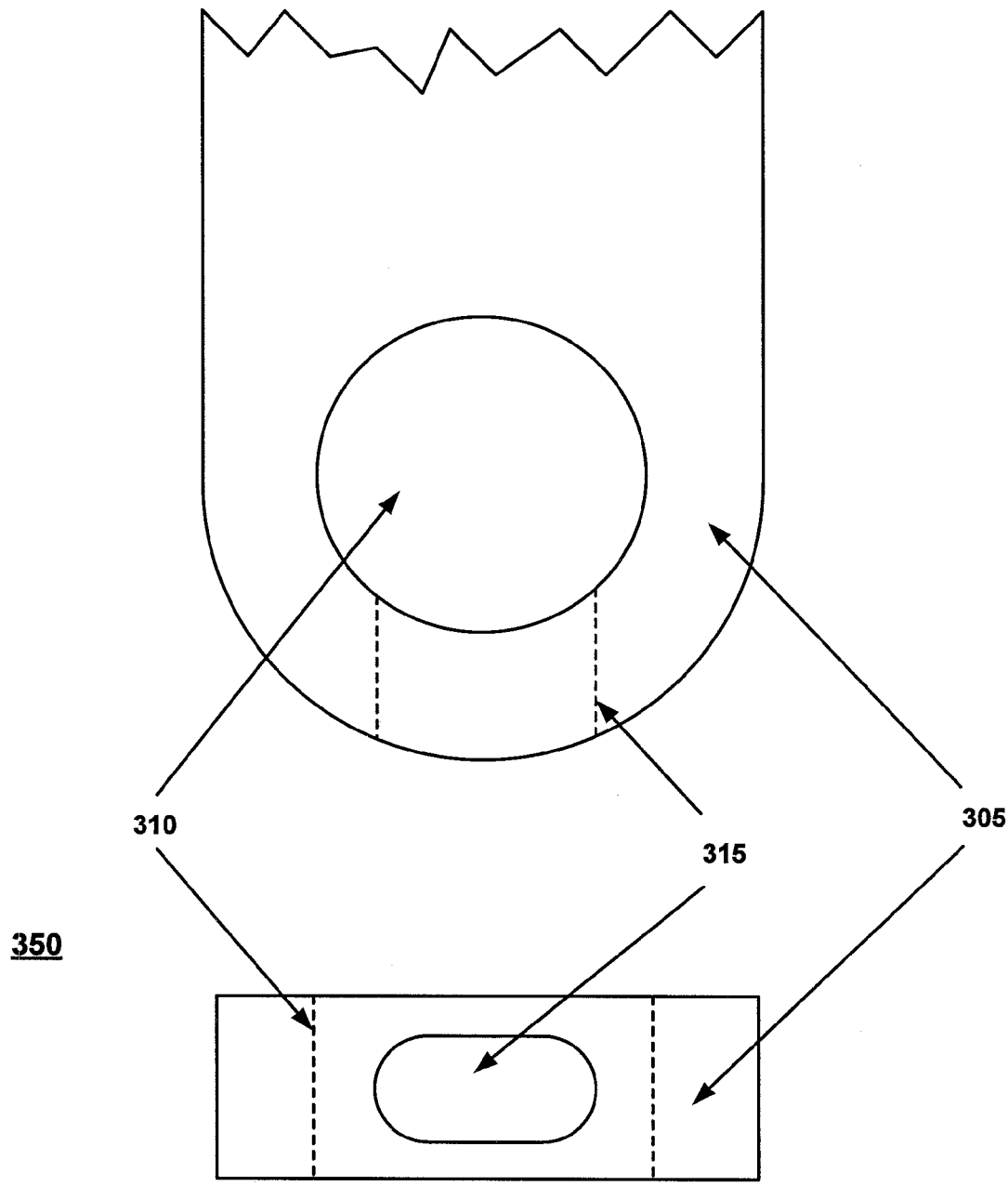
FIG. 3 is a block diagram of an actuator arm in accordance with embodiments of the present invention.

Reference will now be made to FIG. 3, a block diagram including top view 300 and front view 350 of an actuator arm to be used in an actuator arm assembly in a hard disk drive. FIG. 3 represents components of a HDD that may comprise some or all of the features of the components of FIG. 1. FIG. 3 depicts, actuator arm 305, hole 310, and removed portion 315. FIG. 3 comprises components and portions of the present technology that may or may not be used with different embodiments of the present technology and should not be construed to limit the present technology.

In one embodiment, actuator arm 305 is the same actuator arm as actuator arm 145 of FIG. 1. In one embodiment, actuator arm 305 is an outer actuator arm. In one embodiment, actuator arm 305 is an inner actuator arm. FIG. 3 depicts top view 300 which includes dotted lines that represent where removed portion 315 would be located beneath the top surface of actuator arm 305. Front view 350 depicts the opening created by removed portion 315 and dotted lines that represent where hole 310 would be located beneath the front surface of actuator arm 305. In one embodiment, removed portion 315 is adjacent to hole 310. In one embodiment, removed portion 315 is symmetrical along an axis that runs the length of actuator arm 305.

In one embodiment, hole 310 is formed in actuator arm 305 to receive a flange or boss tower of a suspension base plate. FIG. 3 depicts an embodiment of the present technology in which the length of removed portion 315 is perpendicular to the length of hole 310 but is parallel to the length of actuator arm 305. It should be appreciated that removed portion 315 creates an opening in actuator arm 305 and any number of techniques may be used to form removed portion 315.

Actuator arm 305 is an example of an actuator arm that can be fasted to a suspension base plate using a swaging process or technique. In one embodiment, the flange of a suspension base plate is inserted into hole 310, the outer diameter of the flange is then expanded by a swaging process. During the swaging process, a portion of material from the flange of the suspension base plate flows into removed portion 315 of actuator arm 305. Thus, the shape of the suspension base plate changes in a controlled manner and reduces the deformations to both actuator arm 305 and the suspension base plate. Additionally, the portion of material from the flange that flows into removed portion 315 acts to securely fasten the suspension base plate to actuator arm 315 and therefore increase the torque retention of the fastening. The reduced deformations also results in reduced changes in gram loading and reduced z-height variations. In one embodiment, actuator arm 305 is secured to a suspension base plate using ball swaging.

It should be appreciated that FIGS. 2 and 3 depict only two possible embodiments of actuator arms with removed portions. Multiple geometries and configurations exist where the removed portion of the actuator arm is different in shape and relative location.

Figure 4:
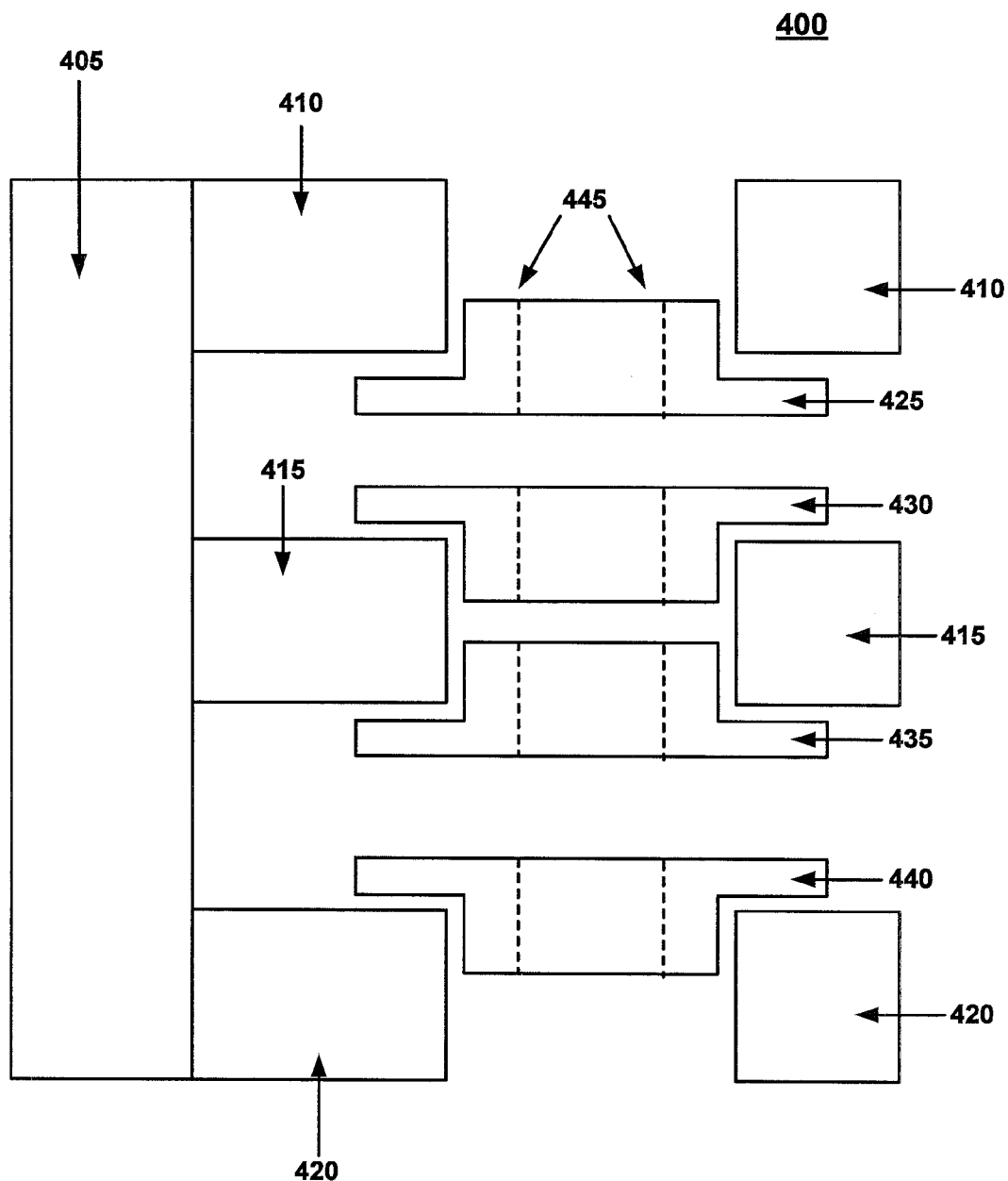
FIG. 4 is a block diagram of components of an HDD in accordance with embodiments of the present invention.

Reference will now be made to FIG. 4, a block diagram of a cross section view of components of an HDD. FIG. 4 represents components of a HDD that may comprise some or all of the features of the components of FIG. 1. FIG. 4 depicts outer actuator arms 410 and 420, inner actuator arm 415, suspension base plates 425, 430, 435 and 440, and hollow 445. FIG. 4 comprises components and portions of the present technology that may or may not be used with different embodiments of the present technology and should not be construed to limit the present technology.

It should be appreciated that outer actuator arms 410 and 420 and inner actuator arm 415 may include features of any of the following; actuator arm 145 of FIG. 1, actuator arm 205 of FIG. 2, and actuator arm 305 of FIG. 3.

FIG. 4 depicts hollow 445 of suspension base plate 425 with dotted lines representing a hollow or hole in suspension base plate 425. Dotted lines are also used to illustrate hollows in suspension base plates 430, 435 and 440. FIG. 4 does not explicitly depict a removed portion in outer actuator arms 410 and 420 and inner actuator arm 415. It should be appreciated that one, all or any combination of the actuator arms of FIG. 4 may include a removed portion. For example, in one embodiment, only outer actuator arms 410 and 420 include a removed portion. In one embodiment, only inner actuator arm 415 includes a removed portion. It should also be appreciated that a HDD may comprise more than three actuator arms including more than one inner actuator arm.

FIG. 4 is drawn to depict a cross section view of the actuator arms that includes depicting a gap in the actuator arms where a hole would be to receive a suspension base plate. For example, outer actuator arm 410 comprises two parts in FIG. 4. The gap between the two parts represents the hole in the actuator arm. In one embodiment, this hole may the same hole that is depicted as hole 210 of FIG. 2 or hole 310 of FIG. 3.

FIG. 4 depicts the flange or boss tower of suspension base plate 425 inserted into the hole of outer actuator arm 410. In one embodiment, suspension base plate 425 would then be swaged to fasten suspension base plate 425 to outer actuator arm 410. In one embodiment, an inner actuator arm may have two suspension base plates swaged to it such as is depicted with inner actuator arm 415 and suspension base plates 430 and 435. FIG. 4 depicts a plurality of actuator arms and suspension base plates in an alignment such that all the suspension base plates may be swaged to their corresponding actuator arms in one step.

FIG. 5 is a flowchart of method 500 for swaging a suspension base plate to an actuator arm for a hard disk drive in accordance with embodiments of the present invention.

At 502, a portion of material adjacent to a hole in the actuator arm is removed to create an opening to receive material. In one embodiment, the removed portion of material is removed from the actuator arm by machine stamping the actuator arm. In one embodiment, the portion of material removed from the actuator arm is parallel to the hold of the actuator arm. In one embodiment, the portion of material removed from the actuator arm is perpendicular to the hold of the actuator arm. In one embodiment, a plurality of actuator arm may have a portion removed in one step.

At 504, a flange of the suspension base plate is inserted into the hole in the actuator arm.

At 506, the suspension base plate is swaged to the actuator arm, wherein the swaging causes material from the suspension base plate to flow into the opening. In one embodiment, ball swaging is used to swage the suspension base plate to the actuator arm. In one embodiment, the swaging causes the outer diameter of the suspension base plate to expand into the hole of the actuator arm. In one embodiment, a plurality of suspension base plates may be swaged to corresponding actuator arms in one step.

At 508, in one embodiment, a gram load of said actuator arm is measured after the swaging. In one embodiment, twist is measured after said swaging. In one embodiment, pitch is measured after the swaging.

At 510, in one embodiment, a z-height variation of said actuator arm is measured after the swaging.

At 512, in one embodiment, a torque retention of the swaging said suspension base plate to the actuator arm is measured. In one embodiment, this is measured for only a limited number of all suspension base plates that are swaged to an actuator arm.

Thus, embodiments of the present invention provide for swaging a suspension base plate to an actuator arm for a hard disk drive.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims. Additionally, in various embodiments of the present technology, the steps and methods described herein do not need to be carried out in the order specified, nor do all steps need to be carried out to accomplish the purposes of the technology.

What is claimed is:

1. An actuator arm assembly comprising:

a pair of suspension base plates, each with a flange coupled with a single hole of An inner actuator arm; and said inner actuator arm having a top surface, a length, and said single hole wherein said single hole is flush with and runs perpendicular to said length of said inner actuator arm, wherein said single hole is configured to receive said flanges of said pair of suspension base plates, wherein said inner actuator arm has a removed portion of material adjacent to said single hole of said inner actuator arm, said removed portion having a thickness less than a thickness of said inner actuator arm, wherein said removed portion of said inner actuator arm is configured to receive a portion of at least one of said flanges of said pair of suspension base plates upon swaging said pair of suspension base plates to said inner actuator arm, said removed portion of said inner actuator arm being symmetrical along an axis running said length of said actuator arm, said removed portion of said inner actuator arm located wholly beneath said top surface Of said inner actuator arm.

2. The actuator arm assembly of claim 1 further comprising an outer actuator arm.

3. The actuator arm assembly of claim 1 further comprising a second inner actuator arm.

4. The actuator arm assembly of claim 1 wherein said removed portion of material adjacent to said hole of said inner actuator arm is removed to create an opening perpendicular to said hole of said inner actuator arm.

5. A hard disk drive comprising:

at least one magnetic disk;

a read/write head configured to read and write data on said at least one magnetic disk;

a pair of suspension base plates coupled with a single hole of an inner actuator arm; and said inner actuator arm having atop surface, a length, and single hole wherein said single hole is flush with and runs perpendicular to said length of said inner actuator arm, wherein said single hole is configured to receive flanges of said pair of suspension base plates, wherein said inner actuator arm has a removed portion of material adjacent to said single hole of said inner actuator arm, said removed portion having a thickness less than a thickness of said inner actuator arm, wherein said removed portion of said inner actuator arm is configured to receive a portion of at least one of said flanges of said pair of suspension base plates upon swaging said pair of suspension base plates to said inner actuator arm, said removed portion of said inner actuator arm being symmetrical along an axis running said length of said actuator arm, said removed portion of said inner actuator arm located wholly beneath said top surface of said inner actuator arm.

6. The hard disk drive of claim 5 further comprising an outer actuator arm.

7. The hard disk drive of claim 5 further comprising a second inner actuator arm.

8. The hard disk drive of claim 5 wherein said removed portion of material adjacent to said hole of said inner actuator arm is removed to create an opening perpendicular to said hole of said inner actuator arm.

\* \* \* \* \*

UNITED STATES PATENT AND TRADEMARK OFFICE
CERTIFICATE OF CORRECTION

Page 1 of 1

PATENT NO. : 8,520,341 B2
APPLICATION NO. : 12/629802
DATED : August 27, 2013
INVENTOR(S) : Gregory Joseph Arnone et al.

It is certified that error appears in the above-identified patent and that said Letters Patent is hereby corrected as shown below:

In the Claims

Column 7, Claim 1, Line 4, Delete: "An"

Insert --an--

Column 7, Claim 1, Line 21, Delete: "Of"

Insert --of--

Column 8, Claim 5, Line 7, Delete: "atop"

Insert --a top--

Column 8, Claim 5, Line 8, Delete: "single hole wherein said single hole is flush with and"

Insert --said single hole wherein said single hole is flush with and--

Signed and Sealed this
Twentieth Day of May, 2014

Michelle K. Lee
*Deputy Director of the United States Patent and Trademark Office*